United States Patent
Lee et al.

[11] Patent Number: 5,718,860
[45] Date of Patent: Feb. 17, 1998

[54] PROCESS FOR THE PREPARATION OF POLYESTER BASE FILM FOR MAGNETIC RECORDING MEDIA

[75] Inventors: Jae-Woong Lee; Joon-Hee Han, both of Kyungki-do, Rep. of Korea

[73] Assignee: SKC Limited, Kyungki-do, Rep. of Korea

[21] Appl. No.: 662,862

[22] Filed: Jun. 12, 1996

[30] Foreign Application Priority Data

Jun. 14, 1995 [KR] Rep. of Korea ............ 95-15770
Sep. 27, 1995 [KR] Rep. of Korea ............ 95-32097

[51] Int. Cl.⁶ ..................... B29C 35/06; B29C 55/12
[52] U.S. Cl. .................... 264/210.5; 264/210.7; 264/235.8; 264/290.2; 264/327; 264/346
[58] Field of Search ................... 264/235.8, 235, 264/346, 327, 210.5, 210.7, 290.2

[56] References Cited

U.S. PATENT DOCUMENTS

| | | | |
|---|---|---|---|
| 3,900,604 | 8/1975 | Tanabe et al. | 264/235 |
| 4,497,865 | 2/1985 | Minami et al. | 264/235.8 |
| 4,677,188 | 6/1987 | Utsumi et al. | 264/235.8 |
| 4,985,537 | 1/1991 | Utsumi et al. | 264/235.8 |
| 5,139,727 | 8/1992 | Utsumi et al. | 264/210.7 |
| 5,401,559 | 3/1995 | Okamoto et al. | 428/143 |
| 5,427,730 | 6/1995 | Son et al. | 264/235.8 |
| 5,534,215 | 7/1996 | Song et al. | 264/235.8 |
| 5,545,364 | 8/1996 | Song et al. | 264/210.5 |
| 5,601,768 | 2/1997 | Kurihara et al. | 264/235.8 |

*Primary Examiner*—Jeffery R. Thurlow
*Attorney, Agent, or Firm*—Anderson, Kill & Olick

[57] ABSTRACT

A polyester base film for magnetic recording media having improved adhesion to the magnetic layer applied thereon as well as good abrasion and scratch resistance prepared by melt-extruding a polyester resin containing inorganic and organic particles to form a sheet; extending the sheet; and heat-setting the extended film, wherein the heat-setting step is carried out by heat-treating a first surface of the film, which is to be coated with a magnetic material, at a temperature ranging from 170° to 290° C. for 1 to 50 seconds so that the crystallinity thereof ranges from 50 to 70% and heat-treating the other surface of the film at a temperatue which is lower than the first heat-treatment temperature by 20° C. or more for 1 to 200 seconds so that the other surface attains a crystallinity which is lower than that of the first surface by at least 5%.

6 Claims, No Drawings

PROCESS FOR THE PREPARATION OF POLYESTER BASE FILM FOR MAGNETIC RECORDING MEDIA

FIELD OF THE INVENTION

The present invention relates to a process for preparing a polyester film having improved surface properties, which is useful as a base film for magnetic recording media.

BACKGROUND OF THE INVENTION

Polyester films are widely used as base films for various magnetic recording media, e.g., video tapes and computer disks, because of their excellent physical and mechanical properties. Such base films for magnetic recording media are usually required to have good adhesion to a magnetic layer coated thereon as well as good abrasion and scratch resistance.

The abrasion- and scratch- resistant properties of a film are particularly important when it is used for preparing magnetic recording media. Specifically, when used as a base film for a video tape, the film tends to be abraded or scratched, e.g., by a guide roll during the magnetic layer coating process thereof and by a calendering roll during the calendering process. The abrading or scratching of a video tape may cause a phenomenon called "drop-out", i.e., the loss or reduction of signals recorded thereon.

In order to impart good abrasion and scratch resistance to a film, various slip agents have been employed to form protrusions on the surface of the film, thereby reducing the area of the film being in contact with machine parts such as guide rolls. For example, in U.S. Pat. No. 3,821,156, a mixture of calcium carbonate and silica particles was employed to enhance the abrasion and scratch resistance of a polyester film. However, this method suffers from the problem that voids tends to form on the film surface because of the poor affinity of the inorganic particles with the polyester resin.

U.S. Pat. No. 4,761,327 describes a method of improving the scratch resistance of the film by way of employing organic particles made of, e.g., a silicone resin together with inorganic particles in order to enhance the affinity between the resin and the inorganic particles. However, the improvement in the abrasion resistance attained by using the above method is still limited because of poor abrasion resistance of the silicone resin itself.

When the adhesion of a magnetic layer coated on a polyester film is poor, magnetic particles tend to fall off the magnetic layer, causing the drop-out problem. The adhesion between a base film and a magnetic layer is usually enhanced by an increase in the crystallinity of the film surface. However, as the crystallinity of the film surface becomes higher, the abrasion or scratch resistance of the film tends to decrease. Therefore, the proportions related to the adhesion and the abrasion/scratch resistance of a film should be properly balanced.

A typical method for imparting a suitable crystallinity to a polyester base film for magnetic recording media is to heat-set the surface of the polyester film at a temperature ranging from 150° to 250° C. for 1 to 200 seconds. However, this method cannot simultaneously achieve enhancements of both the adhesion to the coating layer and the abrasion/scratch resistance of the film since both surfaces of the film are treated under a same condition.

SUMMARY OF THE INVENTION

It is, therefore, a primary object of the present invention to provide a process for preparing a polyester film having improved adhesion to the magnetic layer coated thereon as well as good abrasion and scratch resistance, which is useful as a base film for magnetic recording media, by way of using a modified heat-setting process.

In accordance with the present invention, there is provided a process for preparing a polyester film comprising the steps of: melt-extruding a polyester resin to form a sheet; extending the sheet in the longitudinal and lateral directions to provide a biaxially extended polyester film; and heat-setting the extended film, wherein the heat-setting step is carried out by heat-treating a first surface of the film at a temperature ranging from 170° to 290° C. for 1 to 50 seconds such that the first surface gains a crystallinity ranging from 50 to 70% and heat-treating a second surface of the film at a temperature ranging from 150° to 250° C. for 1 to 200 seconds such that the second surface attains a crystallinity ranging from 40 to 60%, the difference in the crystallinity between the first and the second surfaces of the film being at least 5%.

DETAILED DESCRIPTION OF THE INVENTION

A polyester resin which may be used to prepare the polyester film in accordance with the present invention is produced by a process which comprises transesterifying and polycondensing a dialkyl ester of an aromatic dicarboxylic acid and an aliphatic glycol. The transesterification and polycondensation reactions may be carried out in a batch or continuous mode, while a direct, one-step polymerization may also be used for the preparation of the polyester resin.

Representative dialkyl esters of aromatic dicarboxylic acids which may be used in the present invention include: dialkyl esters of terephthalic acid, isophthalic acid, naphthalene dicarboxylic acid, cyclohexane dicarboxylic acid, diphenoxy-ethane dicarboxylic acid, diphenyl dicarboxylic acid, diphenyl ether dicarboxylic acid, anthracene dicarboxylic acid and α,β-bis(2-chlorophenoxy)ethane-4,4'-dicarboxylic acid, and others. Among them, dimethyl terephthalate and dimethyl-2,6-naphthalate are most preferred.

Exemplary aliphatic glycols which may be used in the present invention include: ethylene glycol, trimethylene glycol, tetramethylene glycol, pentamethylene glycol, hexamethylene glycol and hexylene glycol, and others. Among them, ethylene glycol is most preferred.

The polyester resin which may be preferably used in the present invention is a crystalline polyester resin, e.g., polyethylene terephthalate(PET) and polyalkylene naphthalate. A more preferred polyester resin for use in the present invention includes 80 mole % of ethylene terephthalate repeating units and 20 mole % of copolymeric repeating units derived from other dicarboxylic acids, oxycarboxylic acids and/or diols. Such dicarboxylic acids and oxycarboxylic acids include: isophthalic acid, p-β-hydroxyethoxy benzoic acid, diphenyl dicarboxylic acid, benzophenone-4,4'-dicarboxylic acid, diphenylethane-4,4'-dicarboxylic acid, adipic acid, sebacic acid, sodium 3,5-di(hydroxycarbonyl) benzene sulfonate, p-oxybenzoic acid and the like; and said other diols include: propylene glycol, neopentyl glycol, diethylene glycol, cyclohexane dimethanol and the like.

The transesterification catalyst which can be used in preparing the polyester resin of the present invention may be any one conventionally used in the art such as sodium, manganese, potassium, lithium, calcium, magnesium, barium, zinc, zirconium, cobalt, aluminum and cadmium compounds, and a mixture thereof. Further, the polycondensation catalyst which can be used in the present invention may be any one conventionally used in the art such as titanium, germanium, tin, antimony, zinc, cobalt, aluminum, lead, manganese and calcium compounds, and a mixture thereof.

In the present invention, a mixture of organic particles and inorganic particles may be employed as a slip agent. Especially, a mixture of particles of calcium carbonate, spherical silica and benzoguamine-melamine formaldehyde condensate may be preferably employed. These particles may be incorporated separately or together at any time during the preparation of the polyester of the present invention.

Preferred calcium carbonate particles have an average diameter ranging from 0.05 to 3 μm, preferably from 0.1 to 2.5 μm; and they may be employed in an amount ranging from 0.01 to 0.5 wt %, preferably from 0.2 to 0.45 wt % based on the weight of the polyester film.

Spherical silica which may be used in the present invention preferably has a nearly perfect spherical shape. Preferred spherical silica has an average particle diameter ranging from 0.05 to 3 μm, preferably from 0.1 to 2.0 μm, and it may be employed in the present invention in an amount ranging from 0.01 to 0.5 wt %, preferably from 0.1 to 0.3 wt % based on the weight of the polyester film.

A benzoguamine-melamine-formaldehyde condensate may be prepared by polymerizing melamine formaldehyde and benzoguamine formaldehyde in a conventional method. Preferred benzoguamine-melamine-formaldehyde condensate particles have an average diameter ranging from 0.1 to 5 μm, preferably from 0.5 to 4 μm; and they may be employed in an amount ranging from 0.01 to 0.5 wt %, preferably from 0.05 to 0.2 wt % based on the weight of the polyester film.

The slip agents described above may be added to the polyester resin in the form of a slurry dispersed in a glycol, or a powder. They may be preferably dispersed in ethylene glycol, before the addition to the polyester resin, together with a glycol-soluble dispersant such as an acrylic compound, e.g., sodium polyacrylate, sodium methacrylate and ammonium acrylate, and a benzenesulfonate.

Besides the slip agents, the polyester film of the present invention may further contain other common additives such as antioxidants, antistatic agents, heat stabilizers and dyes. Such additives may be added at any time during the preparation of the polyester, preferably during the transesterification step or immediately prior to the polycondensation step.

The biaxially extended polyester film may be prepared in accordance with the present invention as follows. A polyester resin containing the above-described slip agent particles is melt-extruded into an amorphous cast sheet through a T-die using a conventional method. This sheet is subsequently quenched on a cold roll, and then biaxially extended to produce a biaxially extended polyester film.

At the biaxial extending step, the longitudinal extension may be conducted at a temperature ranging from 60° to 100° C., while the lateral extension is preferably carried out at a temperature ranging from 100° to 140° C.; the draw ratio in the longitudinal direction may range from 2.5 to 6.0, preferably from 3 to 5.5 and the draw ratio in the lateral direction may range from 2.5 to 6.0, preferably 3 to 5.

In accordance with the present invention, each of the two surfaces of the biaxially extended polyester film is heat-set in different ways depending on whether or not the surface is to be post-treated with a coating solution. That is, one surface of the film (a first surface) to be post-treated with a magnetic coating solution is heat-treated at a temperature ranging from 170° to 290° C. for 1 to 50 seconds, preferably at a temperature ranging from 200° to 270° C. for 1 to 20 seconds; and, the other surface of the film (a second surface), which is not subsequently coated, is heat-treated at a temperature ranging from 150° to 250° C. for 1 to 200 seconds, preferably at a temperature ranging from 170° to 230° C. for 1 to 100 seconds. Preferably, the temperature of the first surface treatment is higher than that of the second surface treatment at least by 20° C. The heat treatment may be conducted using hot air or hot steam in a tenter.

The polyester film prepared in accordance with the present invention has the first surface having a crystallinity ranging from 50 to 70% and the second surface having a crystallinity ranging from 40 to 60%, wherein the difference in the crystallinity between the first and the second surfaces of the film is at least 5%, preferably at least 20%.

The thickness of the biaxially extended polyester film produced as described above may be controlled depending on the final use of the film, typically in the range from 5 to 200 μm.

The following Examples are intended to illustrate the present invention more specifically, without limiting the scope of the invention.

In the Examples, the properties of the polyester film were evaluated in accordance with the following methods.

1. Average Particle Diameter

The average diameter of particles was measured as a volumetric average diameter in an ethylene glycol slurry by employing a centrifugation type granulometer (SA-CP2, Shimadzu in Japan).

2. Molecular Weight

The molecular weight of a polymer was measured with a molecular weight measuring apparatus (150C, Waters in U.S.A.) by using m-cresol as a mobile phase at a flow rate of 1 ml/min. and at a column temperature of 100° C.

3. Surface Crystallinity

The surface crystallinity of the film was measured using a FT-IR (FTS60, a product of DIGI Lab.) under the following condition:

(a) Incidence angle: 60°

(b) Incidence depth: 3 μm

For each sample, eight measurements were carried out and the five lowest values among the eight data points were selected and averaged.

4. Adhesion

The adhesion of the film was evaluated by coating an acrylic adhesive to one surface of a film sample, attaching the coated surface of the film to one surface of another film sample by applying a pressure to form a laminated film and then measuring the peel strength of the laminated film using a peel tester at a peel speed of 230 cm/min. The eight measurements were made for each film sample and the five lowest values among eight were selected and averaged.

5. Abrasion Resistance

The abrasion resistance of the film was determined by running a ½ inch-wide film sample against a guide pin of a running tester TBT-300D(a product of Yokohama System, Japan) at a running speed of 3.3 cm/sec, and observing visually or with a microscope, the degree of white powder formation on the surface of the guide pin.

The abrasion resistance was evaluated on the basis of the following criteria:

A: No white powder was formed on the surface of the guide pin.

B: Up to 20% of the surface of the guide pin was covered by a white powder.

C: Up to 50% of the surface of the guide pin was covered by a white powder.

D: The whole surface of the guide pin was covered by a white powder.

6. Scratch Resistance

The scratch resistance of the film was determined by running a ½ inch-wide film sample over a running length of 90 m against a guide pin of a running tester with a surface roughness of 0.2S, at a contact degree (Θ) of 180° and a contact speed of 3.3 cm/minute, and at a temperature of 25° C. and a relative humidity of 60%, while controlling the inlet tension of the tester to 30 g. After two such runs, the film surface was examined with a microscope for damages caused by the guide pin.

The scratch resistance was evaluated on the basis of the following criteria:

⊚: 2 or less scratched lines were formed on the surface of the film.

○: 3 to 4 scratched lines were formed on the surface of the film.

∆: 5 to 6 scratched lines were formed on the surface of the film.

×: 7 or more scratched lines were formed on the surface of the film.

EXAMPLE 1

50 parts by weight of dimethyl terephthalate and 100 parts by weight of ethylene glycol were polymerized in the presence of 0.1 part by weight of manganese acetate as a transesterification catalyst, 0.2 part by weight of antimony trioxide as a polymerization catalyst, 0.2 part by weight of phosphorous acid as a stabilizer, and specified amounts (see Table I) of calcium carbonate, spherical silica and benzoguamine-melamine-formaldehyde condensate particles as slip agents, each having an average diameter given in Table I, to obtain a polyethylene terephthalate resin, which was melt-extruded to produce polyethylene terephthalate resin chips.

The polyethylene terephthalate chips thus obtained were melt-extruded through a die at a temperature ranging from 290° C. to form a sheet. The sheet was extended in a draw ratio of 3.5 in the longitudinal and lateral directions. The resulting extended film was heat-set by blowing hot air or steam against the first surface, and then the second surface thereof under a condition specified in Table I to provide a biaxially extended polyethylene terephthalate film having a thickness of about 15 μm.

EXAMPLES 2 to 4

The procedure of Example 1 was repeated, except that the average diameter and the amount of each of the slip agents were varied as shown in Table I.

EXAMPLES 5 to 7

The procedure of Example 1 was repeated, except that the condition of the heat-set step was varied within the scope of the present invention as shown in Table I.

COMPARATIVE EXAMPLES 1 to 4

The procedure of Example 1 was repeated, except that a single slip agent was employed as shown in Table I.

COMPARATIVE EXAMPLES 5 to 10

The procedure of Example 1 was repeated, except that the condition of the heat-set step was varied outside the scope of the present invention as shown in Table I.

The crystallinity, abrasion resistance, scratch resistance and adhesion of the films thus prepared were measured and the results are shown in Table II.

TABLE I

| | | Slip agents | | | Heat-setting condition | | | |
| | | | | | First surface* | | Second surface** | |
| | | Component | D (μm) | Amount (wt %) | Temp. (°C.) | Time (sec) | Temp. (°C.) | Time (sec) |
| --- | --- | --- | --- | --- | --- | --- | --- | --- |
| Ex. | 1 | A/B/C | 0.40/0.10/0.50 | 0.25/0.20/0.10 | 250 | 20 | 230 | 25 |
| | 2 | A/B/C | 0.54/0.20/0.90 | 0.20/0.15/0.15 | 250 | 20 | 230 | 25 |
| | 3 | A/B/C | 0.65/0.30/1.55 | 0.15/0.10/0.20 | 250 | 20 | 230 | 25 |
| | 4 | A/B/C | 1.55/0.40/2.10 | 0.10/0.15/0.10 | 250 | 20 | 230 | 25 |
| | 5 | A/B/C | 0.40/0.10/0.50 | 0.25/0.20/0.10 | 250 | 1 | 230 | 25 |
| | 6 | A/B/C | 0.40/0.10/0.50 | 0.25/0.20/0.10 | 250 | 5 | 210 | 50 |
| | 7 | A/B/C | 0.40/0.10/0.50 | 0.25/0.20/0.10 | 250 | 10 | 230 | 50 |
| | 8 | A/B/C | 0.40/0.10/0.50 | 0.25/0.20/0.10 | 250 | 20 | 210 | 100 |
| Com. Ex. | 1 | A | 0.40 | 0.30 | 250 | 20 | 230 | 25 |
| | 2 | A | 0.54 | 0.20 | 250 | 20 | 230 | 25 |
| | 3 | B | 0.10 | 0.25 | 250 | 20 | 230 | 25 |
| | 4 | B | 0.30 | 0.15 | 250 | 20 | 230 | 25 |
| | 5 | A/B/C | 0.40/0.10/0.50 | 0.25/0.20/0.10 | 210 | 25 | 210 | 25 |
| | 6 | A/B/C | 0.40/0.10/0.50 | 0.25/0.20/0.10 | 210 | 50 | 210 | 50 |
| | 7 | A/B/C | 0.40/0.10/0.50 | 0.25/0.20/0.10 | 210 | 100 | 210 | 100 |
| | 8 | A/B/C | 0.40/0.10/0.50 | 0.25/0.20/0.10 | 230 | 25 | 230 | 25 |
| | 9 | A/B/C | 0.40/0.10/0.50 | 0.25/0.20/0.10 | 230 | 50 | 230 | 50 |
| | 10 | A/B/C | 0.40/0.10/0.50 | 0.25/0.20/0.10 | 230 | 100 | 230 | 100 |

Footnote:
*: the surface to be post-treated,
**: the surface not to be post-treated,
A: Calcium carbonate,
B: Spherical silica
C: Benzoguamine-melamine-formaldehyde condensate particles

TABLE II

|     |    | C.[1] of the first surface (%) | C. of the second surface (%) | Adhesion (g/cm) | Abrasion Resistance | Scratch resistance |
|-----|----|-------|-------|-----|---|---|
| Ex. | 1  | 69.15 | 44.16 | 500 | A | ○ |
|     | 2  | 69.15 | 44.16 | 500 | A | ◉ |
|     | 3  | 69.15 | 44.16 | 500 | A | ◉ |
|     | 4  | 69.15 | 44.16 | 500 | B | ○ |
|     | 5  | 52.58 | 43.16 | 420 | A | ○ |
|     | 6  | 57.97 | 45.96 | 450 | A | ○ |
|     | 7  | 63.54 | 56.28 | 470 | A | ○ |
|     | 8  | 69.55 | 58.15 | 500 | A | ○ |
| Com. | 1 | 69.15 | 44.16 | 500 | D | x |
| Ex. | 2  | 69.15 | 44.16 | 500 | D | x |
|     | 3  | 69.15 | 44.16 | 500 | C | △ |
|     | 4  | 69.15 | 44.16 | 500 | C | △ |
|     | 5  | 38.10 | 38.10 | 320 | A | ○ |
|     | 6  | 45.10 | 45.10 | 370 | B | ○ |
|     | 7  | 57.59 | 57.59 | 450 | C | ○ |
|     | 8  | 42.88 | 42.86 | 350 | A | ○ |
|     | 9  | 55.53 | 55.87 | 430 | B | ○ |
|     | 10 | 62.34 | 62.36 | 460 | D | ○ |

Footnote: [1]: Crystallinity

As shown in Table II, the biaxially extended polyester films prepared by the inventive process exhibit improved surface properties, i.e., improved abrasion and scratch resistance, and adhesion to the magnetic layer applied thereon.

Specifically, it can be readily seen that if the inorganic particles are not mixed with the organic particles, the abrasion and scratch resistance ratings of the film become poor (see Com. Ex. 1 to 4); and, if the heat-setting condition of the biaxially extended polyester film is not differentiated depending on whether or not the surface is to be post-treated, the adhesion of the film to the magnetic layer becomes weak (see Com. Ex. 5 to 10).

While the invention has been described in connection with the above specific embodiments, it should be recognized that various modifications and changes may be made within the scope of the invention as defined by the claims that follow.

What is claimed is:

1. A process for preparing a polyester film useful for the production of a magnetic recording medium by coating a magnetic material on a first surface thereof, comprising the steps of: melt-extruding a polyester resin containing a mixture of calcium carbonate, spherical silica and benzoquamine-melamine-formaldehyde condensate particles as a slip agent to form a sheet; extending the sheet in longitudinal and lateral directions to provide a biaxially extended polyester film; and heat-setting the extended film, wherein the heat-setting step is carried out in two stages by heat-treating the first surface of the extended film at a temperature ranging from 170° to 290° C. for 1 to 50 seconds such that the first surface gains a crystallinity ranging from 50 to 70%, and heat-treating a second surface of the extended film at a temperature which is at least 20 C. lower than that of the first heat-treatment for 1 to 200 seconds such that the second surface attains a crystallinity which is at least 5% lower than that of the first surface.

2. The process of claim 1, wherein the crystallinity of the second surface is lower than than of the first surface at least by 20%.

3. The process of claim 1, wherein the calcium carbonate particles have an average particle diameter ranging from 0.05 to 3 μm and are employed in an amount ranging from 0.01 to 0.5 wt % based on the weight of the polyester film.

4. The process of claim 1, wherein the spherical silica particles have an average particle diameter ranging from 0.05 to 3 μm and are employed in an amount ranging from 0.01 to 0.5 wt % based on the weight of the polyester film.

5. The process of claim 1, wherein the benzoguamine-melamine-formaldehyde condensate particles have an average diameter ranging from 0.1 to 5 μm and are employed in an amount ranging from 0.01 to 0.5 wt % based on the weight of the polyester film.

6. The process of claim 1, wherein the first surface of the film is heat-treated at a temperature ranging from 200° to 270°C. for 1 to 20 seconds and the second surface of the film is heat-treated at a temperature ranging from 170° to 230° C. for 1 to 100 seconds at the heat-setting step.

* * * * *